(12) United States Patent
Kozakai et al.

(10) Patent No.: US 11,333,515 B2
(45) Date of Patent: May 17, 2022

(54) REGION GUIDANCE SYSTEM AND REGION GUIDANCE PROGRAM (71) Applicants: AISIN CORPORATION, Kariya (JP); TOYOTA JIDOSHA KABUSHIKI KAISHA, Toyota (JP)

(72) Inventors: Hiroyuki Kozakai, Okazaki (JP); Koji Ogawa, Okazaki (JP); Hiroyuki Tamba, Nagoya (JP); Hajime Morikawa, Okazaki (JP); Xin Jin, Nagoya (JP)

(73) Assignees: AISIN CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 224 days.

(21) Appl. No.: 15/753,714

(22) PCT Filed: Aug. 9, 2016

(86) PCT No.: PCT/JP2016/073425
§ 371 (c)(1),
(2) Date: Feb. 20, 2018

(87) PCT Pub. No.: WO2017/033737
PCT Pub. Date: Mar. 2, 2017

(65) Prior Publication Data
US 2018/0252544 A1 Sep. 6, 2018

(30) Foreign Application Priority Data
Aug. 26, 2015 (JP) .............................. JP2015-166373

(51) Int. Cl.
G01C 21/34 (2006.01)
G01C 21/36 (2006.01)
H04W 4/021 (2018.01)

(52) U.S. Cl.
CPC ..... *G01C 21/3476* (2013.01); *G01C 21/3446* (2013.01); *H04W 4/021* (2013.01); *G01C 21/3644* (2013.01)

(58) Field of Classification Search
None
See application file for complete search history.

(56) References Cited

U.S. PATENT DOCUMENTS 7,197,500 B1 * 3/2007 Israni .................... G01C 21/32
340/995.14
7,647,166 B1 * 1/2010 Kerns ................ G01C 21/3679
701/412
(Continued)

FOREIGN PATENT DOCUMENTS

| JP | 2504332 B2 | 10/1993 |
|----|------------|---------|
| JP | H10-311733 A | 11/1998 |
| JP | H11-351899 A | 12/1999 |

OTHER PUBLICATIONS

Nov. 15, 2016 International Search Report issued in International Application No. PCT/JP2016/073425.

*Primary Examiner* — Peter D Nolan
*Assistant Examiner* — Demetra R Smith-Stewart
(74) *Attorney, Agent, or Firm* — Oliff PLC (57) ABSTRACT

Region guidance systems and programs obtain a spot with which guidance information is associated. When there are a plurality of the spots in a region whose boundary is defined, the systems an programs provide guidance on the guidance information associated with one of the spots selected based on a position of an entry spot to the region.

10 Claims, 6 Drawing Sheets (56) References Cited

U.S. PATENT DOCUMENTS

| | | | |
|---|---|---|---|
| 2009/0198443 A1* | 8/2009 | Yamazaki | G01C 21/3605 |
| | | | 701/414 |
| 2009/0201176 A1* | 8/2009 | Shimada | G01C 21/20 |
| | | | 340/944 |
| 2010/0121886 A1* | 5/2010 | Koshiba | G01C 21/32 |
| | | | 707/803 |
| 2011/0153186 A1* | 6/2011 | Jakobson | G01C 21/20 |
| | | | 701/532 |
| 2012/0136895 A1* | 5/2012 | Johnson | G01C 21/32 |
| | | | 707/776 |
| 2014/0136100 A1* | 5/2014 | Drysdale | G01C 21/3679 |
| | | | 701/461 |
| 2014/0324335 A1* | 10/2014 | Jensen | G01C 21/3682 |
| | | | 701/438 |
| 2015/0241230 A1* | 8/2015 | Davidson | G01C 21/34 |
| | | | 701/533 |
| 2016/0034828 A1* | 2/2016 | Sarawgi | G06Q 10/02 |
| | | | 705/5 |
| 2016/0258773 A1* | 9/2016 | Santilli | G06Q 10/0833 |
| 2017/0090479 A1* | 3/2017 | Wilcox | G05D 1/0219 |

* cited by examiner

REGION GUIDANCE SYSTEM AND REGION GUIDANCE PROGRAM

TECHNICAL FIELD

Related technical fields include region guidance systems and programs.

BACKGROUND

There is known a technique in which, when a vehicle passes through a boundary, a city name is informed if the boundary type is a city boundary, and a prefecture name is informed if the boundary type is a prefectural boundary (see JP 10-311733 A). In JP 10-311733 A, since prefectural boundaries and city boundaries are defined in a map database, city names and prefecture names can be informed. In addition, there is also known a technique for displaying an image of a symbolic area for an administrative district, etc., instead of an administrative district name such as a city name or a prefecture name (see JP 11-351899 A).

SUMMARY

In JP 10-311733 A and JP 11-351899 A, however, there is a problem that regardless of from which position a vehicle enters an administrative district, guidance on the same information is provided for the administrative district. Therefore, there is a problem that guidance is provided that is difficult for a driver present at a spot where the vehicle has entered the administrative district to associate. Needless to say, by obtaining smaller administrative districts with which guidance is associated, guidance suited for a spot where the vehicle has entered an administrative district can be provided; however, this causes a problem that a boundary needs to be defined for each of the smaller administrative districts.

Exemplary embodiments of the broad inventive principles described herein provide a technique that allows to provide guidance on a region with information appropriate to a spot where an entry to the region is made.

Exemplary embodiments provide region guidance systems and programs obtain a spot with which guidance information is associated. When there are a plurality of the spots in a region whose boundary is defined, the systems an programs provide guidance on the guidance information associated with one of the spots selected based on a position of an entry spot to the region.

Beneficially, since a spot for which guidance on guidance information is to be provided is selected based on the position of an entry spot where an entry to a region is made, guidance on information appropriate to the position of the entry spot can be provided. In addition, since a spot for which guidance on guidance information is to be provided is selected based on the position of the entry spot, there is no need to define a boundary for each spot with which guidance information is associated.

DETAILED DESCRIPTION OF EXEMPLARY EMBODIMENTS

Here, embodiments will be described in the following order:
(1) Configuration of a navigation apparatus;
(2) Region guidance process;
(3) Second embodiment; and
(4) Other embodiments.

(1) Configuration of a Navigation Apparatus

Figure 1:
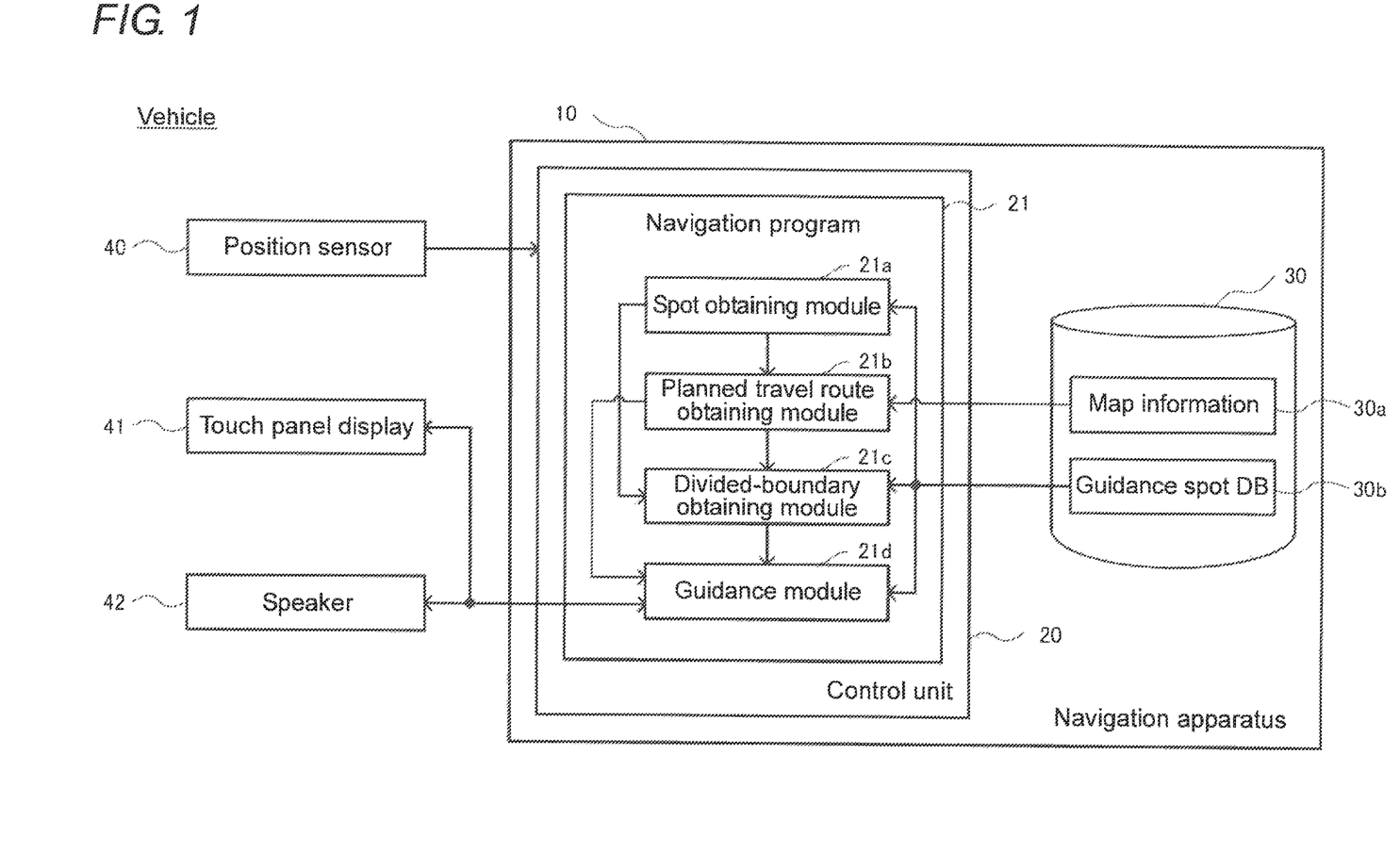
FIG. 1 is a block diagram of a navigation apparatus serving as a region guidance system.

FIG. 1 is a block diagram showing a configuration of a navigation apparatus 10 serving as a region guidance system according to one embodiment. The navigation apparatus 10 is provided in a vehicle. The navigation apparatus 10 includes a control unit 20 and a storage medium (e.g., recording medium 30). The control unit 20 includes a CPU, and a storage medium (e.g., a RAM, a ROM, etc.), and executes programs stored in the recording medium 30 and the ROM. The recording medium 30 records map information 30a and a guidance spot DB (database) 30b. (As used herein, the term "storage medium" is not intended to encompass transitory signals.)

The map information 30a includes node data representing the positions of intersections (nodes) set on roads, etc.; link data representing information about road sections (links) connecting the nodes; and shape interpolation point data representing the position of a shape interpolation point provided on a road section (e.g., on a center line in a width direction). The link data includes lane information indicating a structure of a lane included in a road section; information indicating the length (link length) of a road section in a traveling direction; and information indicating a road type (a distinction between a toll road and a general road) for each link. In addition, the map information 30a includes region information. The region information is information indicating, for each of a plurality of regions, the name and boundary of the region. In the present embodiment, the region is an administrative district, specifically, a prefecture. The region information includes information that identifies a polygon which approximates a region, and a boundary of the region is identified by a contour of the polygon.

The guidance spot DB 30b is a database that records, for each of a plurality of guidance spots (spots), coordinates on a map and guidance information such that the coordinates and the guidance information are associated with each other. Each guidance spot is present in any of the regions, and there may be a plurality of guidance spots in a single region. Note that at least one guidance spot (e.g., a spot where there is an administrative office building of an administrative district or a major spot such as a tourist spot or a station) is present in a single region. In the guidance spot DB 30b, guidance image data is recorded as guidance information. The guidance image data is image data representing an image that symbolizes a guidance spot or a region in which the guidance spot is present (an image of a region name, a natural landscape, an event scene, a building, a specialty, a person, dress, etc.).

The vehicle includes a position sensor 40, a touch panel display 41, a speaker 42, and a communication unit 43.

The position sensor 40 includes a UPS receiving unit, a vehicle speed sensor, a gyro sensor, etc., and the control unit 20 identifies a vehicle's current position, based on signals obtained by these sensors. Alternatively, the control unit 20 may identify a vehicle's current position on a road section having a shape that matches a travel path, by performing known map matching using the map information 30*a*. The touch panel display 41 serves as a display apparatus that displays a map and various types of images for guidance under the control of the control unit 20, and as an input apparatus that accepts a touch operation with a finger, etc., on a screen and outputs the content of the touch operation to the control unit 20. The speaker 42 outputs audio under the control of the control unit 20.

The control unit 20 executes a navigation program 21. The navigation program 21 includes a spot obtaining module 21*a*, a planned travel route obtaining module 21*b*, a divided-boundary obtaining module 21*c*, and a guidance module 21*d*.

The spot obtaining module 21*a* is a program module that allows the control unit 20 to implement a function of obtaining a guidance spot with which guidance information is associated. Specifically, by the function of the spot obtaining module 21*a*, the control unit 20 obtains a guidance spot present in a region that the vehicle is going to enter. Namely, when the vehicle's current position approaches within a predetermined distance (e.g., 50 m) from a boundary of a region, the control unit 20 obtains a guidance spot whose coordinates are present in the region that the vehicle can enter by passing through the boundary, from the guidance spot DB 30*b*.

The planned travel route obtaining module 21*b* is a program module that allows the control unit 20 to implement a function of obtaining a planned travel route. By the function of the planned travel route obtaining module 21*b*, the control unit 20 searches for a vehicle's planned travel route that connects a departure location to a destination by a known route search technique such as Dijkstra's algorithm, and records data representing the planned travel route (not shown) in the recording medium 30. Then, by the function of the planned travel route obtaining module 21*b*, the control unit 20 obtains the planned travel route from the data recorded in the recording medium 30. When a planned travel route is not searched for, data representing a planned travel route is not recorded in the recording medium 30, and thus, a planned travel route cannot be obtained. In a state in which data representing a planned travel route is recorded in the recording medium 30, the control unit 20 provides guidance on the planned travel route. The guidance on the planned travel route may refer to, for example, highlighting of road sections on the planned travel route n a map, or guidance on traveling directions at intersections, etc., to take a course on the planned travel route.

A planned travel route is composed of a plurality of road sections. A planned travel route may not be one that is searched for by the control unit 20, but may be one that is received from an external server, etc. A planned travel route is searched when user's operations for setting a departure location and a destination are accepted, and when the operations are not accepted, there is no planned travel route.

The divided-boundary obtaining module 21*c* is a program module that allows the control unit 20 to implement a function of obtaining, when there are a plurality of guidance spots in a region whose boundary is defined, divided boundaries which are portions of the boundary corresponding to the plurality of guidance spots, respectively, by dividing the boundary based on the coordinates of the plurality of guidance spots. A technique for dividing a boundary will be described below using drawings.

Figure 2A:
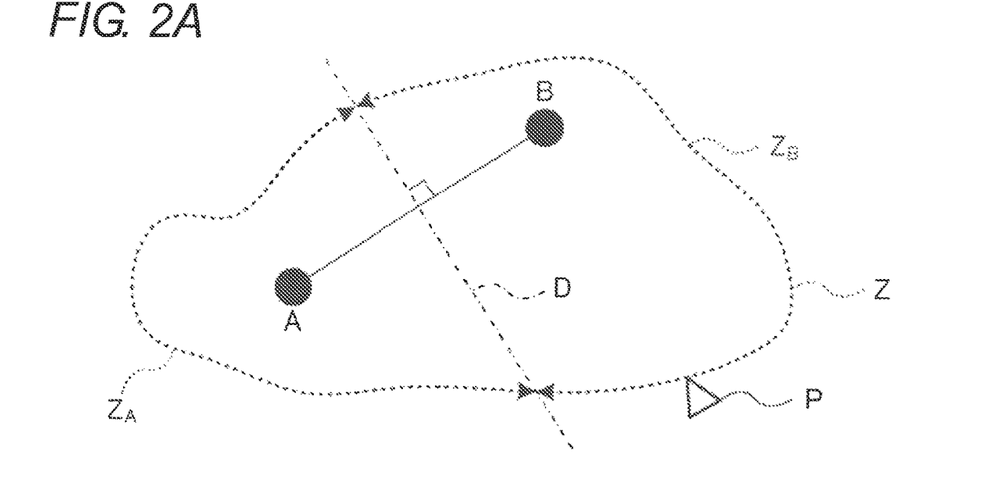
FIGS. 2A to 2C are schematic diagrams of regions.

By the function of the divided-boundary obtaining module 21*c*, when there are two guidance spots in a region whose boundary is defined, the control unit 20 may obtain divided boundaries which are formed by dividing the boundary at the points of intersection of a perpendicular bisector of a line segment connecting the two guidance spots and the boundary. FIG. 2A is a schematic diagram showing a state in which a boundary is divided. As shown in the drawing, there are guidance spots A and B in a single region surrounded by a boundary Z (dashed line). When there are thus two guidance spots A and B in a single region, by the function of the divided-boundary obtaining module 21*c*, the control unit 20 creates a dividing line D (dash-dotted line) Which is a perpendicular bisector of a line segment AB (solid line) connecting the two guidance spots A and B, divides the boundary Z at the points of intersection of the dividing line D and the boundary Z, and thereby obtains divided boundaries $Z_A$ and $Z_B$ (dashed-line arrows). Note that a portion of the boundary Z that is more on the guidance spot A side than the dividing line 1) serves as the divided boundary $Z_A$ corresponding to the guidance spot A, and a portion of the boundary Z that is more on the guidance spot B side than the dividing line 1) serves as the divided boundary $Z_B$ corresponding to the guidance spot B.

Figure 2B:
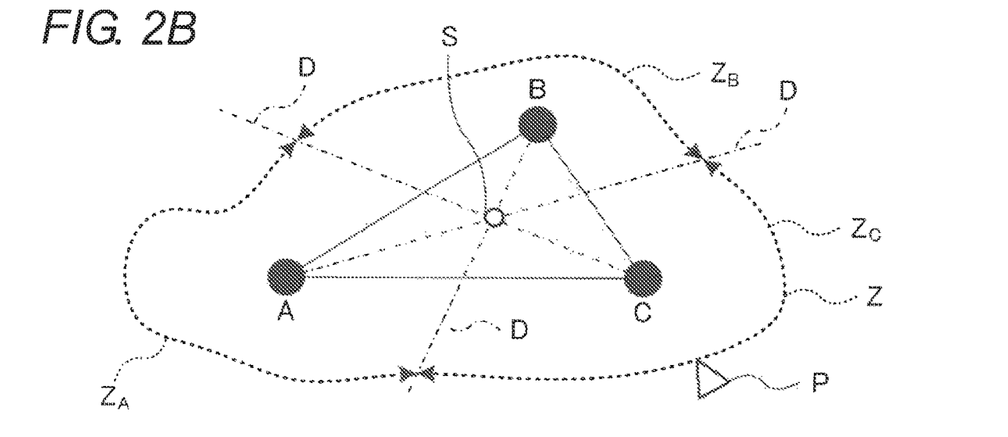

FIG. 2B is a schematic diagram showing a state in which a boundary is divided when there are three guidance spots A to C in a region. By the function of the divided-boundary obtaining module 21*c*, when there are three or more guidance spots A to C in a region whose boundary Z is defined, the control unit 20 obtains divided boundaries $Z_A$ to $Z_C$ (dashed-line arrows) which are formed by dividing the boundary Z at the points of intersection of dividing lines D (dash-dotted lines) and the boundary Z, the dividing lines D being straight lines passing through a reference point S inside a polygon which is composed of sides AB, BC, and CA (solid lines) connecting the guidance spots A to C and through the midpoints of the respective sides AB, BC, and CA. In the present embodiment, the reference point S is the centroid of the polygon. Note that three divided regions, each surrounded by the boundary Z and two dividing hoes D, are formed, and a portion of the boundary Z that delimits a divided region including the guidance spot A serves as the divided boundary $Z_A$ corresponding to the guidance spot A, a portion of the boundary Z that delimits a divided region including the guidance spot B serves as the divided boundary $Z_B$ corresponding to the guidance spot B, and a portion of the boundary Z that delimits a divided region including the guidance spot C serves as the divided boundary $Z_C$ corresponding to the guidance spot C. Note also that it can be said that the guidance spots A to C corresponding to the divided boundaries $Z_A$ to $Z_C$ are the guidance spots A to C closest to the divided boundaries $Z_A$ to $Z_C$.

The guidance module 21*d* is a program module that allows the control unit 20 to implement a function of providing, when there are a plurality of guidance spots A to C in a region whose boundary Z is defined, guidance on guidance information associated with one of the guidance spots A to C selected based on the position of an entry spot to the region. Specifically, by the function of the guidance module 21*d*, when there is no planned travel route, the control unit 20 obtains one of divided boundaries $Z_A$ to $Z_C$ to which an entry spot belongs, and selects one of guidance spots A to C corresponding to the obtained one of divided boundaries $Z_A$ to $Z_C$. The control unit 20 obtains, as an entry spot, a current position P obtained when the vehicle's current position P reaches a position on the boundary Z which is divided into the divided boundaries $Z_A$ to $Z_C$ (e.g., a position within 5 in from the boundary Z), and identifies which one of the divided boundaries $Z_A$ to $Z_C$ the entry spot belongs to. Note that the control unit 20 may obtain, as an entry spot, the point of intersection of a road section where the vehicle is currently traveling and the boundary Z.

Then, by the function of the guidance module 21d, the control unit 20 selects one of the guidance spots A to C corresponding to the one of divided boundaries $Z_A$ to $Z_C$ to which the entry spot belongs, and obtains guidance information. (guidance image data) about the selected one of the guidance spots A to C from the guidance spot DB 30b. As described above, the guidance spots A to C corresponding to the divided boundaries $Z_A$ to $Z_C$ are the guidance spots A to C closest to the divided boundaries $Z_A$ to $Z_C$. Furthermore, by the function of the guidance module 21d, the control unit 20 outputs the guidance image data obtained from the guidance spot DB 30b to the touch panel display 41 to display an image of the guidance image data. In addition, by the function of the guidance module 21d, the control unit 20 outputs an audio signal that vocalizes the fact that the vehicle has entered the region (administrative district) to the speaker 42 simultaneously with the output of the guidance image data.

In addition, as shown in FIG. 2A, the control unit 20 obtains divided boundaries $Z_A$ and $Z_B$ which are formed by dividing a boundary Z at the points of intersection of a perpendicular bisector (dividing line D) of a line segment AB connecting two guidance spots A and B and the boundary Z. Thus, the control unit 20 can divide the boundary Z into two pans in a balanced manner by the dividing line 1) which is sandwiched between the two guidance spots A and B.

Furthermore, as shown in FIG. 2B, the control unit 20 divides a boundary Z by dividing lines D which are straight lines passing through a reference point S inside a polygon which is composed of sides AB, BC, and CA connecting guidance spots A to C and through the midpoints of the respective sides AB, BC, and CA. Thus, the control unit 20 can divide the boundary Z into three or more divided boundaries $Z_A$ to $Z_C$ in a balanced manner. Furthermore, by setting the centroid of the polygon composed of the sides AB, BC, and CA as the reference point S, the boundary Z can be divided almost equally into three or more parts.

The function of the guidance module 21d for when there is no planned travel route is described above. The function of the guidance module 21d for when there is a planned travel route will be described below. By the function of the guidance module 21d, when there are a plurality of spots in a region whose boundary is defined, the control unit 20 provides guidance on guidance information associated with one of a plurality of guidance spots A to C selected based on a positional relationship between the plurality of guidance spots A to C and a planned travel route. Here, when there is a planned travel route, by the function of the guidance module 21d, the control unit 20 selects guidance information, guidance on which is to be provided, based on a positional relationship between a plurality of guidance spots A to C and the planned travel route, instead of guidance information associated with one of divided boundaries $Z_A$ to $Z_C$ to which an entry spot belongs.

Figure 2C:
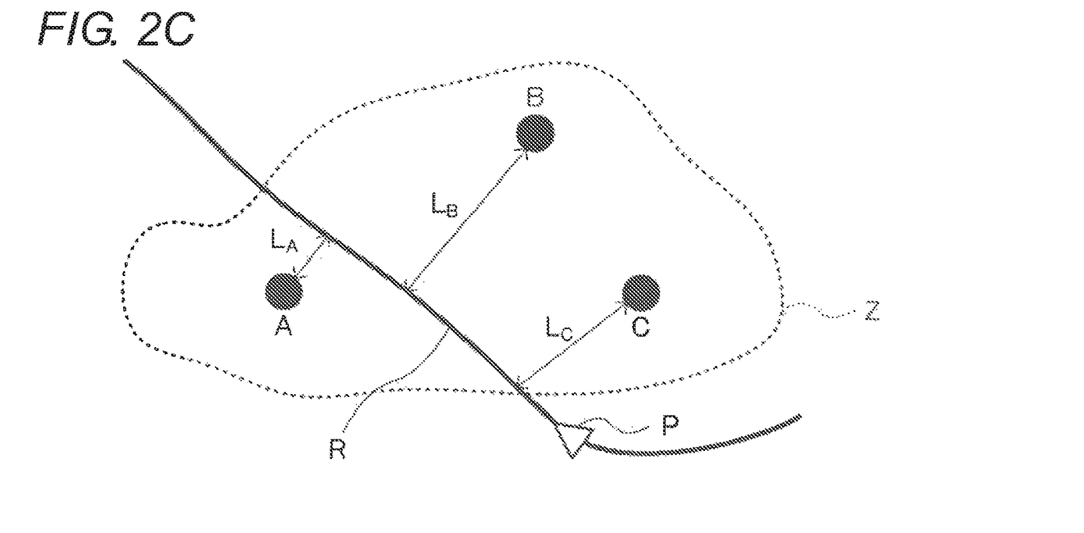

FIG. 2C is a schematic diagram showing a state in which one of three guidance spots A to C in a region is selected based on a positional relationship between the guidance spots A to C and a planned travel route R (thick line). As shown in FIG. 2C, a vehicle's current position P moves along the planned travel route R and is going to enter a region surrounded by a boundary Z. In the present embodiment, by the function of the guidance module 21d, the control unit 20 provides guidance on guidance information associated with one of the guidance spots A to C closest to the planned travel route R. Namely, the control unit 20 selects one of the guidance spots A to C closest to the planned travel route R and provides guidance on guidance information associated with the one of the guidance spots A to C. The control unit 20 calculates the shortest distances $L_A$ to $L_C$ from the guidance spots A to C to the planned travel route R, and obtains guidance image data associated with one of the guidance spots A to C with the smallest shortest distance $L_A$, $L_B$, or $L_C$ from the guidance spot DB 30b. Note that the shortest distances $L_A$ to $L_C$ are straight-line distances. Furthermore, by the function of the guidance module 21d, the control unit 20 outputs the guidance image data obtained from the guidance spot DB 30b to the touch panel display 41 to display an image of the guidance image data. In addition, by the function of the guidance module 21d, the control unit 20 outputs an audio signal that vocalizes the fact that the vehicle has entered the region (administrative district) to the speaker 42 simultaneously with the output of the guidance image data.

In the above-described configuration, one of guidance spots A to C for which guidance on guidance information is to be provided is selected based on the position of an entry spot where an entry to a region is made. Thus, guidance on information appropriate to the position of the entry spot can be provided. Specifically, guidance information, guidance on which is to be provided, can be switched on a per divided boundary $Z_A$ to $Z_C$ basis, the divided boundaries $Z_A$ to $Z_C$ being obtained by dividing a single boundary Z. Thus, guidance suited for areas corresponding to the divided boundaries $Z_A$ to $Z_C$, respectively, can be provided. In addition, since one of the guidance spots A to C for which guidance on guidance information is to be provided is selected based on the position of an entry spot, there is no need to define a boundary for each of the guidance spots A to C with which guidance information is associated. Furthermore, guidance on guidance information of the guidance spots A to C related to a planned travel route R can be provided. Since guidance on guidance information associated with one of the guidance spots A to C closest to the planned travel route R is provided, guidance on guidance information of one of the guidance spots A to C that is the closest spot the vehicle plans to travel can be provided.

(2) Region Guidance Process

Figure 3:
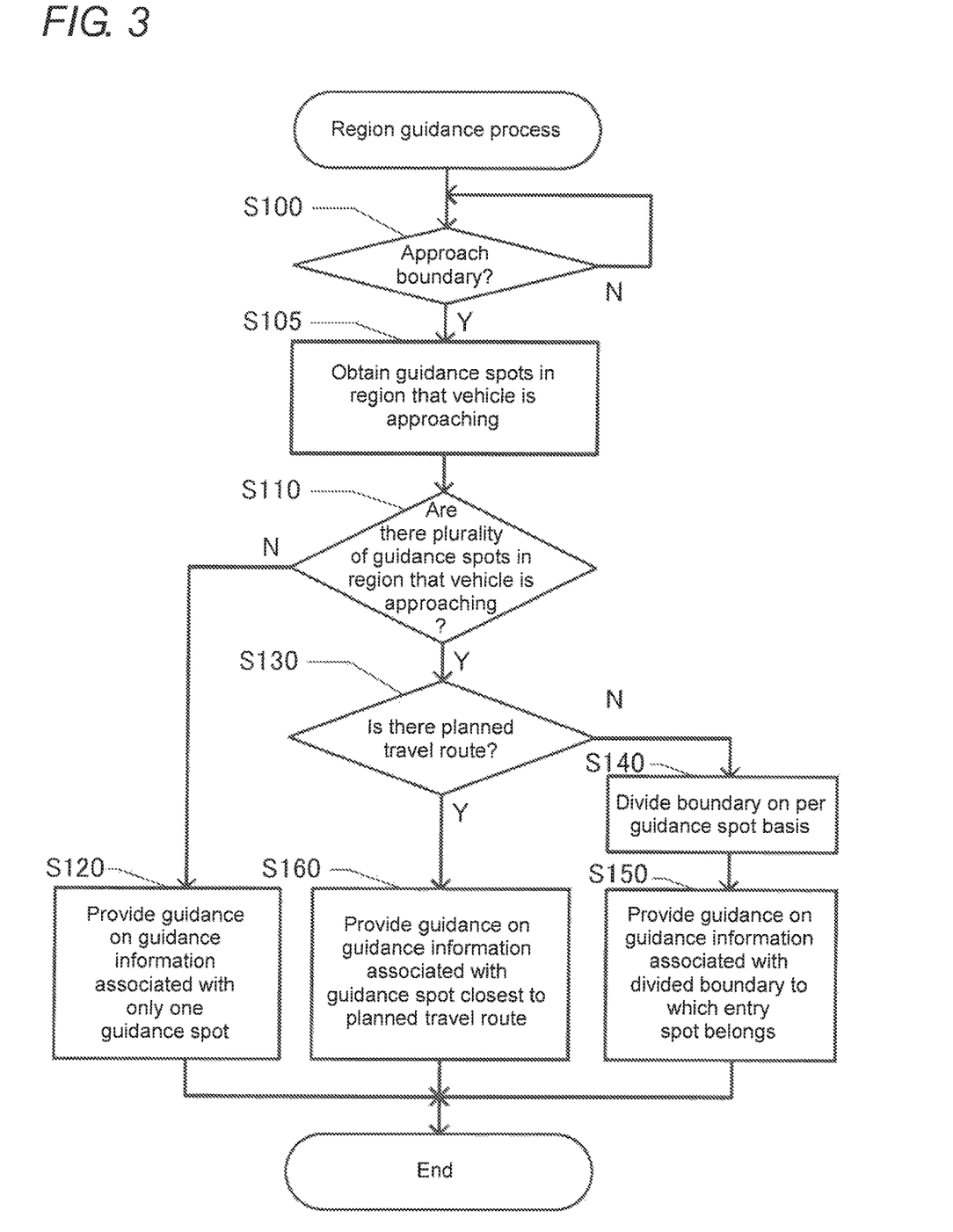
FIG. 3 is a flowchart of a region guidance process.

Next, an example of a region guidance process will be described in detail. FIG. 3 is a flowchart of a region guidance process. The region guidance process is a process performed while a mobile unit (a vehicle, etc.) Which is a guidance target is moving. First, by the function of the spot obtaining module 21a, the control unit 20 determines whether the vehicle has approached a boundary Z (step S100). The vehicle having approached a boundary Z may refer to that the shortest straight-line distance from a vehicle's current position P to the boundary Z of a region reaches less than or equal to a threshold value (e.g., 30 m), or may refer to that a distance on a road section from the vehicle's current position P to the boundary Z of the region reaches less than or equal to a threshold value (e.g., 30 m).

Then, by the function of the spot obtaining module 21a, the control unit 20 obtains guidance a spots) A to C in a region that the vehicle is approaching (step S105). Namely, by the function of the spot obtaining module 21a, the control unit 20 obtains the guidance spot(s) A to C in the region that the vehicle is approaching among the guidance spots A to C with which guidance information is associated. Then, by the function of the spot obtaining module 21a, the control unit 20 determines whether there are a plurality of guidance spots A to C in the region that the vehicle is approaching (step S110).

If it is not determined that there are a plurality of guidance spots A to C in the region that the vehicle is approaching (step S110: N), by the function of the guidance module 21d, the control unit 20 provides guidance on guidance information associated with the only one guidance spot A, B, or C (step S120). Namely, by the function of the guidance module 21d, when the vehicle's current position P is located on the boundary Z, the control unit 20 obtains guidance information associated with the only one guidance spot A, B, or C present within the boundary Z from the guidance spot DB 30b, and displays the guidance information (guidance image) on the touch panel display 41.

If it is determined that there are a plurality of guidance spots A to C in the region that the vehicle is approaching (step S110: Y), by the function of the planned travel route obtaining module 21b, the control unit 20 determines whether there is a planned travel route R (step S130). Namely, by the function of the planned travel route obtaining module 21b, the control unit 20 determines whether data representing a planned travel route R (not shown) is recorded in the recording medium 30. Then, if data representing a planned travel route R is recorded, i.e., if guidance on a planned travel route R which is searched for in advance is being provided, the control unit 20 determines that there is a planned travel route R.

If it is not determined that there is a planned travel route R (step S130: N), by the function of the divided-boundary obtaining module 21c, the control unit 20 divides the boundary Z on a per guidance spot A to C basis (step S140). Namely, the control unit 20 divides the boundary Z that the vehicle is approaching into divided boundaries $Z_A$ to $Z_C$ corresponding to the guidance spots A to C, respectively, which are present within the boundary Z. When, as shown in FIG. 2A, there are two guidance spots A, B, and/or C in the boundary Z that the vehicle is approaching, the control unit 20 divides the boundary Z at the points of intersection of a perpendicular bisector (dividing line D) of a line segment AB connecting the two guidance spots A and B and the boundary Z. When, as shown in FIG. 2B, there are three or more guidance spots A to C in the boundary Z that the vehicle is approaching, the control unit 20 divides the boundary Z at the points of intersection of dividing lines D and the boundary Z, the dividing lines D being straight lines passing through a reference point S inside a polygon which is composed of sides AB, BC, and CA connecting the guidance spots A to C and through the midpoints of the respective sides AB, BC, and CA.

Then, by the function of the guidance module 21d, the control unit 20 provides guidance on guidance information associated with one of the divided boundaries $Z_A$ to $Z_C$ to which an entry spot belongs (step S150). Namely, by the function of the guidance module 21d, when the vehicle's current position P is located on the boundary Z, the control unit 20 obtains the current position P as an entry spot and identifies one of the divided boundaries $Z_A$ to $Z_C$ to which the entry spot belongs. Then, the control unit 20 obtains guidance information associated with one of the guidance spots A to C corresponding to the one of the divided boundaries $Z_A$ to $Z_C$ to which the entry spot belongs from the guidance spot DB 30b, and displays the guidance information (guidance image) on the touch panel display 41.

If it is determined that there is a planned travel route R (step S130: Y), by the function of the guidance module 21d, the control unit 20 provides guidance on guidance information associated with one of the guidance spots A to C closest to the planned travel route R (step S160). Namely, the control unit 20 provides guidance on guidance information associated with one of the guidance spots A to C closest to the planned travel route R, as one of the guidance spots A to C selected based on a positional relationship with the planned travel route R. Specifically, the control unit 20 calculates the shortest distances $L_A$ to $L_C$ from the guidance spots A to C to the planned travel route R, and obtains guidance information associated with one of the guidance spots A to C with the smallest shortest distance $L_A$, $L_B$, or $L_C$ from the guidance spot DB 30b. Then, when the vehicle's current position P is located on the boundary Z, the control unit 20 displays the guidance information (guidance image) obtained from the guidance spot DB 30b on the touch panel display 41.

(3) Second Embodiment

Figure 4:
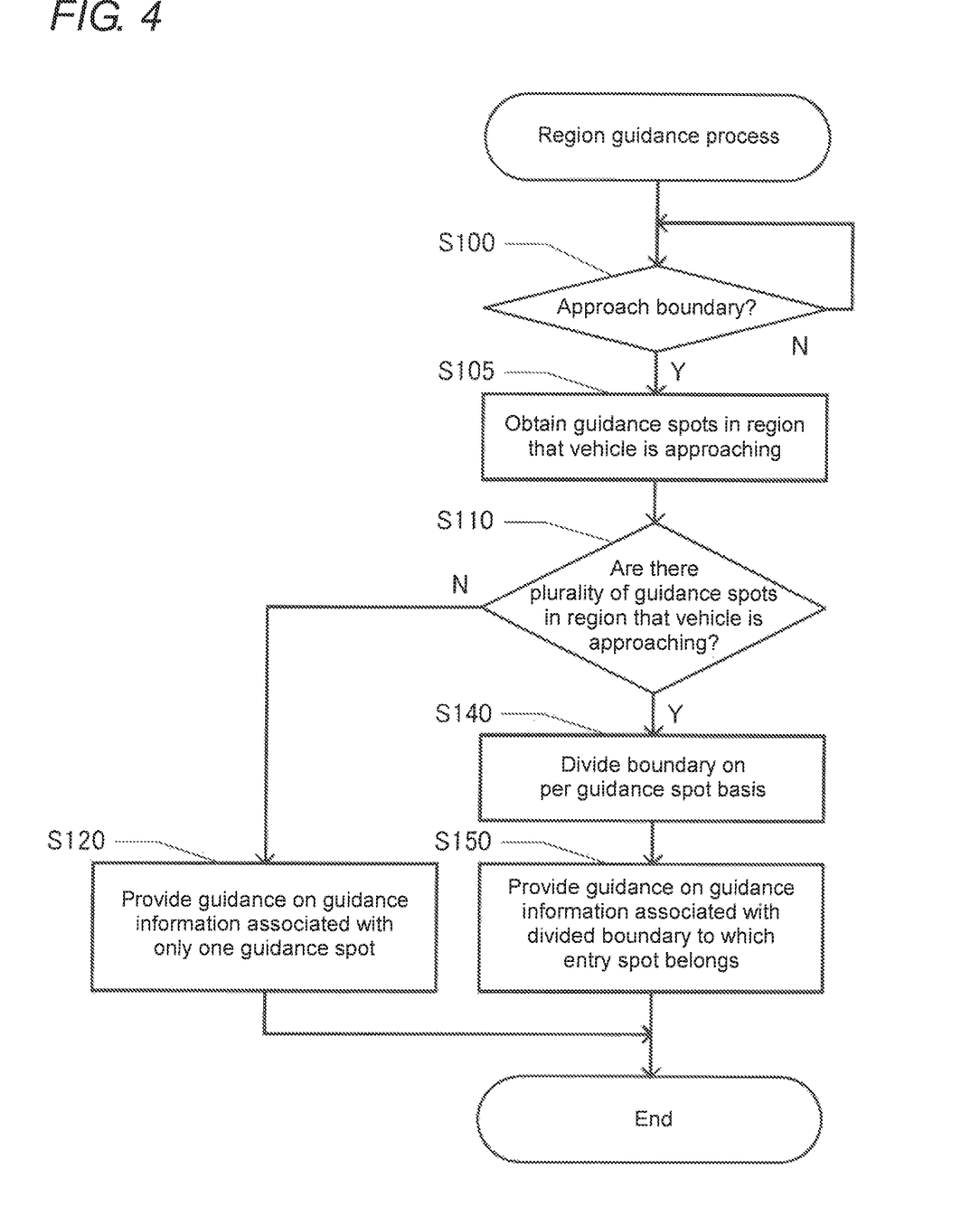
FIG. 4 is a flowchart of a region guidance process of a second embodiment.

FIG. 4 is a flowchart of a region guidance process according to a second embodiment. In the second embodiment, steps S130 and S160 are omitted from the region guidance process of the above-described embodiment (FIG. 3). Namely, the control unit 20 obtains one of divided boundaries $Z_A$ to $Z_C$ to which an entry spot to a region belongs, regardless of whether there is a planned travel route R, and provides guidance on guidance information associated with one of guidance spots A to C corresponding to the one of the divided boundaries $Z_A$ to $Z_C$. Also, in this configuration, the coordinates of a plurality of guidance spots A to C are defined in advance, and thus, there is no need to define a boundary Z for each of the plurality of guidance spots A to C.

(4) Other Embodiments

Figure 5A:
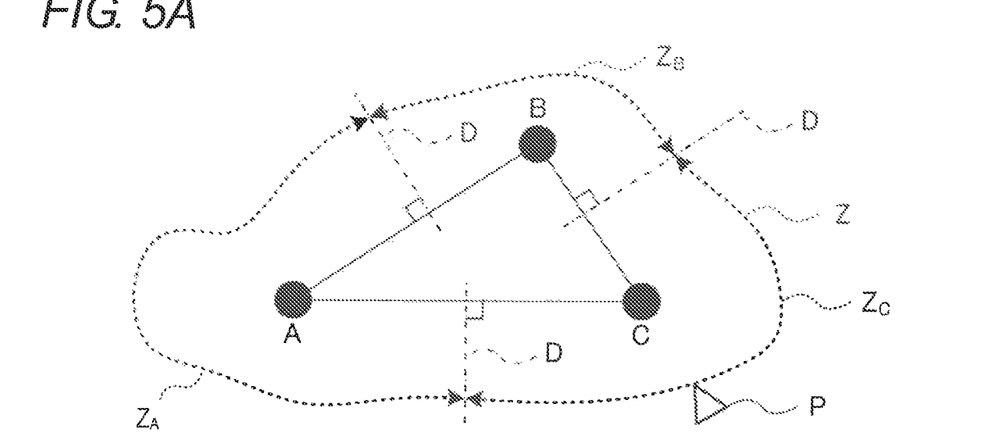
FIGS. 5A to 5C are schematic diagrams of regions of other embodiments.
Figure 5B:
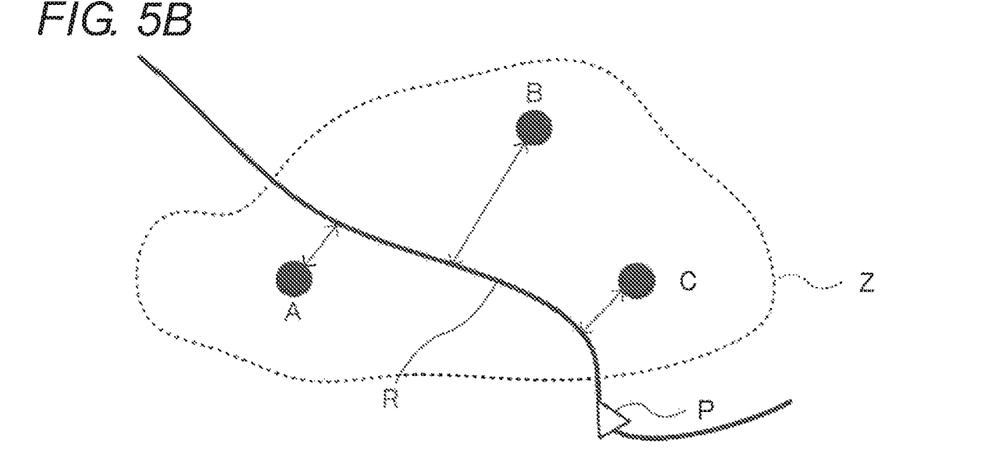
Figure 5C:
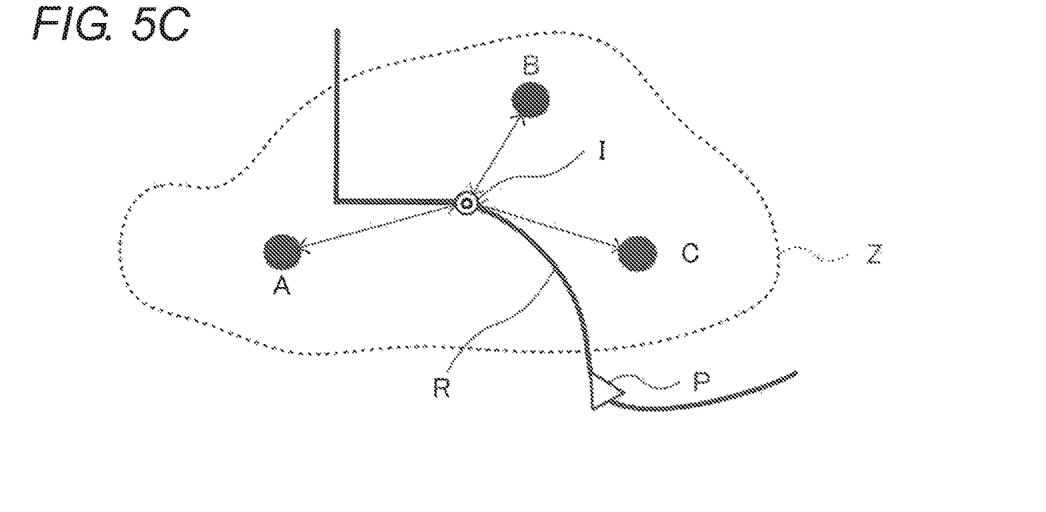

FIGS. 5A to 5C are schematic diagrams of regions of other embodiments. As shown in FIG. 5A, by the function of the divided-boundary obtaining module 21c, when there are three or more guidance spots A to C in a region whose boundary Z is defined, the control unit 20 may obtain divided boundaries $Z_A$ to $Z_C$ which are formed by dividing the boundary Z at the points of intersection of dividing lines D and the boundary Z, the dividing lines D being perpendicular lines from respective sides AB, BC, and CA of a polygon which is composed of the sides connecting the guidance spots A to C. Also, by such a technique, the boundary Z can be divided into three or more parts. Furthermore, the dividing lines D are connected to the midpoints of the respective sides AB, BC, and CA of the polygon. By this, the boundary Z can be divided almost equally into three or more parts.

In addition, by the function of the guidance module 21d, the control unit 20 may provide guidance on guidance information associated with one of a plurality of guidance spots A to C whose distance to the planned travel route R reaches less than or equal to a reference distance first when the vehicle travels along a planned travel route R. In FIG. 5B, it is assumed that, of guidance spots A to C, two guidance spots A and C have such a shortest distance to a planned travel route R that is less than or equal to a reference distance. Namely, of the guidance spots A to C, the guidance spots A and C correspond to spots close to the planned travel route R to some extent. In FIG. 5B, when the vehicle travels along the planned travel route R, of the guidance spots A and C, the vehicle first approaches the guidance spot C. Hence, the control unit 20 obtains guidance information associated with the guidance spot C from the guidance spot DB 30*b* and displays the guidance information on the touch panel display 41. According to the above configuration, of the guidance spots A and C close to the planned travel route R to some extent, guidance on guidance information of the guidance spot C that the vehicle first approaches can be provided. It can prevent a user from having a feeling of strangeness by being provided with guidance on guidance information about a spot that the vehicle does not approach for a while.

Furthermore, by the function of the guidance module 21*d*, the control unit 20 may provide guidance on guidance information associated with one of guidance spots A to C with the smallest distance from a point of interest on a planned travel route R. In FIG. 5C, of spots on a planned travel route R, an interchange I (double circle) at which the vehicle plans to exit a toll road serves as a point of interest. The control unit 20 obtains guidance information associated with a guidance spot B with the smallest straight-line distance to the interchange I among guidance spots A to C from the guidance spot DB 30*b*, and displays the guidance information on the touch panel display 41. By this, guidance on the guidance information of the guidance spot B close to the specific point of interest on the planned travel route R can be provided. In particular, it can be prevented from providing guidance on guidance information of the guidance spot C that the vehicle just simply passes through nearby on the toll road.

Note that the point of interest does not necessarily need to be the interchange I at which the vehicle plans to exist a toll road, and may be a destination, a pass-through location, or a guidance location on the planned travel route R. By this, guidance on guidance information of a spot close to any of the destination, pass-through location, guidance location, and interchange I at which the vehicle plans to exit a toll road can be provided. In addition, guidance on guidance information of a spot at which the user is expected to stay long can be provided.

Figure 6A:
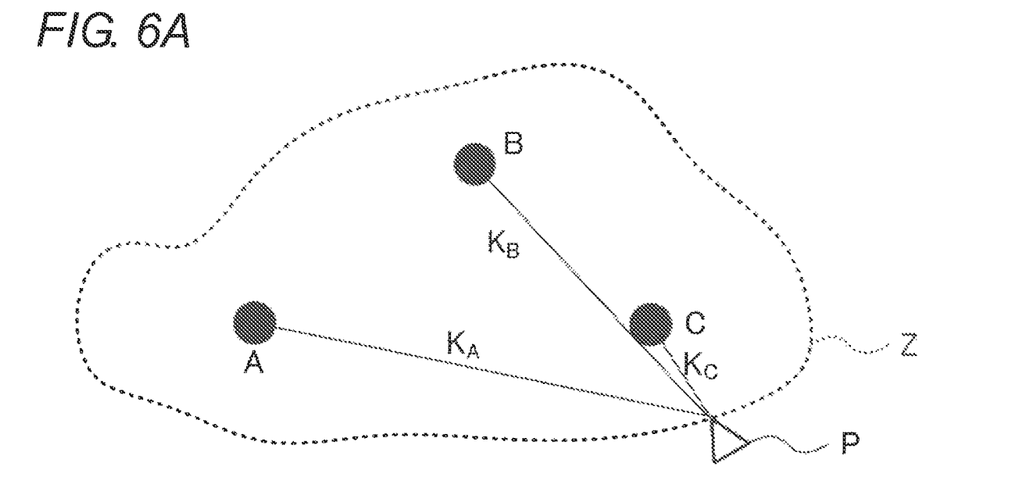
FIGS. 6A and 6B are schematic diagrams of regions of other embodiments.

In addition, by the function of the guidance module 21*d*, when there are a plurality of guidance spots A to C in a region, the control unit 20 may provide guidance on guidance information associated with one of the guidance spots A to C closest to the position of an entry spot to the region. Namely, the control unit 20 does not necessarily need to select one of the guidance spots A to C based on divided boundaries $Z_A$ to $Z_C$, and may provide guidance on guidance information associated with one of the guidance spots A to C that is simply closest to the vehicle's current position upon entry to the region. For example, as shown in FIG. 6A, the control unit 20 may calculate straight-line distances $K_A$ to $K_C$ between guidance spots A to C and an entry spot, and select the guidance spot C whose straight-line distance is the smallest among the straight-line distances $K_A$ to $K_C$. In such a case, guidance on guidance information of one of the guidance spots A to C that the user can easily associate at the entry spot can be provided, and thus, guidance on guidance information appropriate to the entry spot can be provided.

Note that the control unit 20 does not necessarily need to select one of the guidance spots A to C based on the straight-line distances $K_A$ to $K_C$ between the guidance spots A to C and the entry spot. For example, the control unit 20 may set each of the guidance spots A to C as a destination, search for planned travel routes with the entry spot being a departure location, and select one of the guidance spots A to C with the smallest distance traveled or the smallest time required when the vehicle travels along the planned travel routes.

Figure 6B:
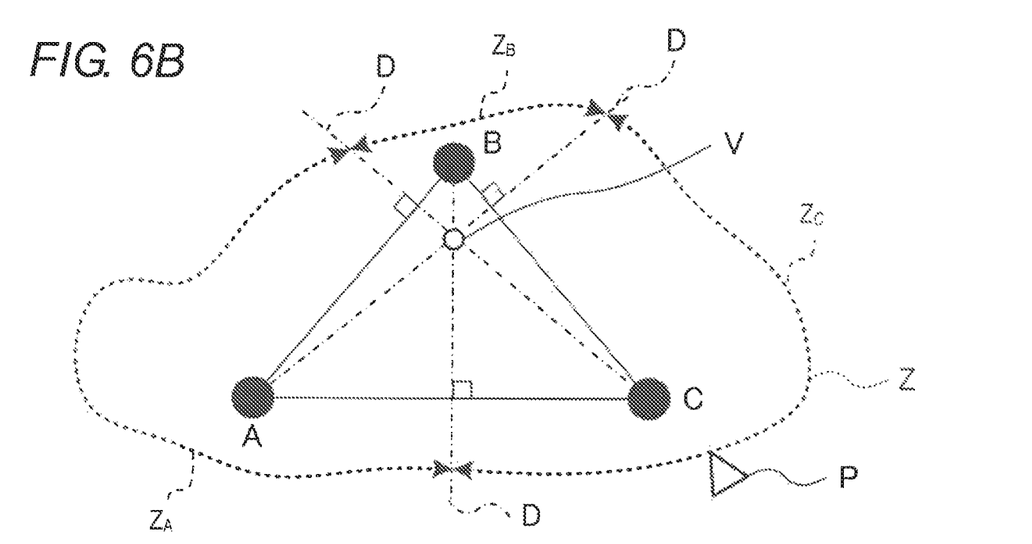

Furthermore, as shown in FIG. 6B, by the function of the divided-boundary obtaining module 21*c*, when there are three guidance spots A to C in a region whose boundary Z is defined, the control unit 20 may obtain divided boundaries $Z_A$ to $Z_C$ which are formed by dividing the boundary Z at the points of intersection of dividing lines D (dash-dotted lines) and the boundary Z, the dividing lines D being perpendicular lines drawn perpendicularly down from the respective vertices of a triangle composed of sides AB, BC, and CA (solid lines) to the respective sides of the triangle connecting the guidance spots A to C. Note that each dividing line D forms a line that passes through the orthocenter of the triangle which is composed of the sides AB, BC, and CA connecting the guidance spots A to C and through a corresponding vertex.

Furthermore, by the function of the guidance module 21*d*, when there are a plurality of guidance spots A to C in a region, the control unit 20 may provide guidance on guidance information associated with one of the guidance spots A to C selected based on the position of an entry spot to the region, and provide guidance on region guidance information associated with the entire region. Namely, when the vehicle enters a certain region, the control unit 20 may provide guidance not only on guidance information about a spot present in the region but also on region guidance information associated with the entire region. Specifically, the guidance information may indicate an event, other than an administrative district name, that symbolizes the spot, and the region guidance information may indicate the administrative district name of the region. For example, in the case of FIG. 2B, the control unit 20 may provide guidance on an image of a building that symbolizes a guidance spot C (e.g., a city, a town, or a village), as guidance information and provide guidance on the administrative district name (e.g., a prefecture name) of a region (e.g., a prefecture) to which the guidance spot C belongs, as region guidance information. In this case, the user can recognize an administrative district that the vehicle has entered and can recognize a symbol that the user can easily associate at an entry spot, and thus can recognize the symbol and the administrative district in an association manner. In addition, by providing guidance on the administrative district name of a larger region, the possibility of the user misidentifying that the vehicle has entered a smaller administrative district (e.g., a city, a town, or a village) where the symbol is present can be suppressed.

Although, in the above-described embodiments, the region guidance system is mounted on a vehicle, the region guidance system may be a server that can communicate with a vehicle. For example, a server may transmit guidance information for a guidance target to a vehicle, and a vehicle-mounted device may provide guidance based on the guidance information.

The above-described embodiments may be modified. For example, guidance information may be any information that provides guidance on a matter related to a spot or a neighboring area of the spot. Guidance on guidance information may be provided by means of an image or audio. In addition, a spot refers to a point, at least the coordinates of which on a map are defined. Note that a spot may be an area with a range, but a spot does not need to be defined with a boundary of the area. A region may be any range on a map whose boundary is defined. For example, a region may be a range corresponding to an administrative district or a country.

Defining a boundary refers to that information by which a boundary can be identified is prepared in advance. A boundary may be identified by a contour of a polygon that approximates a region, or may be identified by a plurality of coordinates on the boundary. A divided-boundary obtaining unit obtains divided boundaries that are divided in advance, and does not necessarily need to perform a process of dividing a boundary every time guidance on guidance information is provided. An entry spot is a spot at which a mobile unit (a vehicle, a portable terminal, etc.) to which guidance on guidance information is to be provided enters a region, and is a spot at which a travel path of the mobile unit intersects a boundary. A spot corresponding to a divided boundary may be, for example, a spot with the smallest shortest distance, the smallest average distance, or the smallest time required to travel from the divided boundary to which an entry spot belongs to the spot.

Here, a divided boundary may be any divided boundary that is obtained by dividing a boundary based on the coordinates of a plurality of spots, and various techniques for dividing a boundary are considered. For example, a boundary may be divided such that divided boundaries have equal lengths. Furthermore, a boundary may be divided such that ranges, each surrounded by a divided boundary and a straight line connecting both ends of the divided boundary, have equal areas. In addition, when there are two spots in a region whose boundary is defined, the divided-boundary obtaining unit may obtain divided boundaries which are formed by dividing the boundary at the points of intersection of a perpendicular bisector of a line segment connecting the two spots and the boundary. By this, the boundary can be divided into two parts in a balanced manner by the perpendicular bisector sandwiched between the two spots.

Furthermore, the divided-boundary obtaining unit may obtain, when there are three or more spots in a region whose boundary is defined, divided boundaries which are formed by dividing the boundary at the points of intersection of straight lines and the boundary, the straight lines passing through a reference point inside a polygon which is composed of sides connecting the spots and through the midpoints of the respective sides. By this, the boundary can be divided into three or more divided boundaries in a balanced manner. Here, the reference point may be any point inside the polygon, and may be a geometric center point (an incenter, a circumcenter, an orthocenter, or an excenter) of the polygon. In addition, the reference point may be the centroid of the polygon. By this, the boundary can be divided almost equally into three or more parts.

Furthermore, the divided-boundary obtaining unit may obtain, when there are three or more spots in a region whose boundary is defined, divided boundaries which are formed by dividing the boundary at the points of intersection of perpendicular lines from respective sides of a polygon and the boundary, the polygon being composed of the sides connecting the spots. Also, by such a technique, the boundary can be divided into three or more parts. Furthermore, the perpendicular lines may be connected to the midpoints of the respective sides of the polygon. By this, the boundary can be divided almost equally into three or more parts.

Furthermore, a technique for providing guidance on a plurality of pieces of guidance information for a single region in a switching manner can also be applied as a program or a method. In addition, cases in which a system, a program, or a method such as that described above is implemented as a single apparatus, implemented by a plurality of apparatuses, or implemented using common components to those included in a vehicle can be assumed, and various types of modes are included. For example, it is possible to provide a region guidance apparatus, method, or program that includes means such as those described above. In addition, changes may be made as appropriate, such as a part is software and a part is hardware. Furthermore, the system can also be implemented as a recording medium for a program that controls the region guidance system. Needless to say, the software recording medium may be a magnetic recording medium or may be a magneto-optical recording medium, and any recording medium to be developed in the future can also be considered in the exact same manner.

The invention claimed is:

1. A region guidance system comprising:
    a position sensor;
    a display; and
    a processor programmed to:
        determine via the position sensor whether a single region whose boundary has been defined has been approached;
        obtain at least one spot in the region with which guidance information is associated after the processor determines that the region has been approached;
        provide on the display, when a plurality of the spots are included in the region, guidance on the guidance information associated with only one of the spots, the only one of the spots being selected from the plurality of the spots in the region by the processor based on a position of an entry spot to the region, wherein the only one of the spots is closest to the position of the entry spot to the region;
        obtain, when there are the plurality of spots in the region, divided boundaries by dividing the boundary based on coordinates of the plurality of spots, the divided boundaries being portions of the boundary corresponding to the plurality of spots, respectively;
        obtain one of the divided boundaries to which the entry spot belongs; and
        select the only one of the spots corresponding to the obtained divided boundary.

2. The region guidance system according to claim 1, wherein the processor is programmed to obtain, when there are two spots in the region whose boundary is defined, divided boundaries formed by dividing the boundary at points of intersection of a perpendicular bisector of a line segment connecting the two spots and the boundary.

3. The region guidance system according to claim 1, wherein the processor is programmed to obtain, when there are three or more spots in the region whose boundary is defined, divided boundaries formed by dividing the boundary at points of intersection of straight lines and the boundary, the straight lines passing through a reference point inside a polygon composed of sides connecting the spots and through midpoints of the respective sides.

4. The region guidance system according to claim 3, wherein the reference point is a centroid of the polygon.

5. The region guidance system according to claim 1, wherein the processor is programmed to obtain, when there are three or more spots in the region whose boundary is defined, divided boundaries formed by dividing the boundary at points of intersection of perpendicular lines from respective sides of a polygon and the boundary, the polygon being composed of the sides, and the sides connecting the spots.

6. The region guidance system according to claim 5, wherein the perpendicular lines are connected to midpoints of the respective sides of the polygon.

7. The region guidance system according to claim 1, wherein the processor is programmed to obtain, when there are three spots in the region whose boundary is defined, divided boundaries formed by dividing the boundary at points of intersection of perpendicular lines and the boundary, the perpendicular lines being drawn perpendicularly down from respective vertices of a triangle to respective sides of the triangle, the triangle being composed of the sides, and the sides connecting the spots.

8. The region guidance system according to claim 1, wherein the processor is programmed to provide, when there are the plurality of spots in the region, guidance on:
   guidance information associated with only one of the spots selected based on the position of the entry spot to the region; and
   region guidance information associated with the entire region.

9. The region guidance system according to claim 8, wherein:
   the guidance information indicates an event other than an administrative district name, the event symbolizing the spot; and
   the region guidance information indicates an administrative district name of the region.

10. A computer-readable storage medium storing a computer-readable region guidance program causing a computer to perform functions including:
   determining via a position sensor whether a single region whose boundary has been defined has been approached;
   obtaining at least one spot in the region with which guidance information is associated after the computer determines that the region has been approached; and
   providing with a display, when a plurality of the spots are included in the region, guidance on the guidance information associated with only one of the spots, the only one of the spots being selected from the plurality of the spots in the region by the computer based on a position of an entry spot to the region, wherein the only one of the spots is closest to the position of the entry spot to the region;
   obtaining, when there are the plurality of spots in the region, divided boundaries by dividing the boundary based on coordinates of the plurality of spots, the divided boundaries being portions of the boundary corresponding to the plurality of spots, respectively;
   obtaining one of the divided boundaries to which the entry spot belongs; and
   selecting the only one of the spots corresponding to the obtained divided boundary;
   wherein the determining, the obtaining, the selecting and the providing are functions performed by the computer.

\* \* \* \* \*